United States Patent [19]

Straumanis

[11] 3,890,078
[45] June 17, 1975

[54] NONINTERACTING EXTRUDER CONTROL

[75] Inventor: Maris A. Straumanis, Columbus, Ohio

[73] Assignee: Industrial Nucleonics Corporation, Columbus, Ohio

[22] Filed: Jan. 31, 1972

[21] Appl. No.: 222,103

[52] U.S. Cl. ............... 425/141; 425/145; 425/377; 264/40
[51] Int. Cl. .............................................. B29f 3/06
[58] Field of Search ............ 425/141, 145; 164/154

[56] References Cited
UNITED STATES PATENTS

| | | | |
|---|---|---|---|
| 3,212,127 | 10/1965 | Flook, Jr. et al. | 425/141 |
| 3,286,302 | 11/1966 | Doering | 425/141 |
| 3,307,215 | 3/1967 | Gerhard et al. | 425/141 |
| 3,358,743 | 12/1967 | Adams | 164/154 |
| 3,510,374 | 5/1970 | Walker | 164/154 UX |

*Primary Examiner*—R. Spencer Annear
*Attorney, Agent, or Firm*—Allan M. Lowe, Esq.; William T. Fryer, III; C. Henry Peterson

[57] ABSTRACT

Thickness of a sheet produced by an extruder and throughput of the sheet are controlled so that sheet thickness and throughput controls do not interact with each other. In one embodiment, throughput is controlled by the take-away speed of the sheet from the extruder whereby the take-away speed is responsive to a take-away error derived by comparing a take-away speed measurement with a set point therefor. Speed of a screw feeding material to the extruder is controlled in response to the throughput error signal and an indication of the error between the sheet thickness and a set point value therefor. In a second embodiment, throughput is determined by the screw speed in response to an error between screw speed set point and measured screw speed. Sheet take-away speed, i.e., line speed, is determined in response to the throughput error signal and an error signal derived by comparing measured sheet thickness and a sheet thickness set point.

26 Claims, 4 Drawing Figures

NONINTERACTING EXTRUDER CONTROL

FIELD OF INVENTION

The present invention relates generally to control systems and methods and more particularly to a system and method for controlling throughput and a property of a product produced by a manufacturing machine such that throughput and the property are controlled in a noninteracting manner.

BACKGROUND OF THE INVENTION

In certain manufacturing processes and machines, it is desired to control throughput, the rate at which a product is produced by the process or machine, and a property of the product. In many manufacturing machines or processes, however, the property and throughput are interrelated. For example, in plastic extruders, throughput is determined, inter alia, by the rate at which plastic material is fed into the extruder by a screw, or the rate at which a sheet is removed from the extruder by rollers responsive to a plastic sheet derived from a die head of the extruder. The rate at which the sheet is removed from the extruder is frequently referred to as take-away speed. Take-away speed is directly related to throughput because it controls the amount of material fed by the extruder to a processor downstream of the extruder or a windup reel. Take-away speed also has an effect on a property, namely thickness, of the sheet because the sheet is in a plastic, deformable state as it is withdrawn from the extruder die head by takeaway or cold rolls. Another factor controlling take-away speed and thickness of an extruded sheet is the rate at which material is fed to the extruder, i.e., screw speed. Thickness is controlled by screw speed because the amount of material fed into the extruder in a predetermined time interval is directly related to the amount of material withdrawn from the extruder during time interval of the same duration. Because plastic material in the extruder can be considered as having a constant density and the direct relationship between input and output material of the extruder, thickness is a linear function of screw speed. Screw speed has an effect on throughput because the thickness of a sheet is directly related to throughput.

Throughput is properly defined in the prior art as sheet weight per unit area multiplied by sheet width multiplied by takeaway speed. Since the sheet has a constant density, its weight per unit area is directly proportional to its thickness, which in turn is controlled as a direct function of screw speed. In modern extruders, sheet width is maintained constant by knives positioned downstream of the extruder die head so that sheet width is not a throughput factor. Thereby, throughput can be controlled in response to screw speed or take-away speed.

One prior art reference for controlling throughput and thickness of a plastic sheet produced by an extruder includes a sheet thickness gauge for deriving a signal that controls takeaway speed of a sheet from an extruder. The thickness gauge signal is combined with measurements of sheet take-away speed and width to derive a throughput control signal. The throughput control signal is compared with a throughput set point to derive an error signal that controls the feed rate of plastic material being applied to the extruder. The system of the prior art reference is of the iterative type whereby throughput error signals affect the extruder screw speed and thereby the feed rate of material into the extruder. In response to changes in the rate of material being fed to the extruder, changes in thickness of the manufactured plastic sheet are sensed to increase the sheet take-away speed. The change in take-away speed is reflected in throughput so that a new throughput error signal is derived to control the feed rate of input material to the extruder. The system repeatedly functions in the described manner until throughput and thickness are properly adjusted. The disadvantages of such iterative control action are apparent to those skilled in the art.

BRIEF DESCRIPTION OF THE INVENTION

In accordance with the present invention, throughput of a product produced by a manufacturing process or machine and a property of the product are controlled in a noninteracting manner, whereby iterative control as disclosed in the prior art does not occur. Hence, if the property being controlled is the thickness of a sheet produced by an extruder, throughput changes are made independently of sheet thickness variations by responding only to an error signal derived by comparing actual or measured throughput with a set point value therefor. Sheet thickness is controlled by combining a function of the throughput error signal and a function of a thickness error signal derived by comparing measured or actual sheet thickness with a set point value therefor. The functions which modify the throughput and thickness error signals are derived from an equation modelling sheet thickness to take-away speed and the speed with which material is fed to the process or machine.

In accordance with one embodiment of the invention, the throughput error signal controls line or take-away speed of the sheet from the extruder, while the rate at which the material is fed to the extruder, the screw speed, is determined by combining signals which are functions of the throughput and thickness errors. In accordance with a second embodiment of the invention, the throughput error signal controls screw speed exclusively, and combined signals that are functions of throughput and thickness errors control take-away speed.

In the specific embodiments of the present invention, throughput can be set equal to take away speed since thickness is controlled in a non-interacting manner and can be considered as being constant, whereby the only parameter affecting throughput is take-away speed.

In accordance with certain features of the invention, safetys are imposed on certain operating characteristics of the extruder. In the first embodiment, the safetys are set to predetermined values to control line speed, while screw speed is controlled in response to the model equation. In the second embodiment, screw speeds are set to predetermined values in response to the safetys being exceeded (in either a positive or negative direction), while line speed is controlled in response to the model equation. Thereby, noninteraction between the throughput and thickness controls is provided even when a predetermined safety condition is exceeded.

It is, accordingly, an object of the present invention to provide a new and improved system for and method of controlling a property of a product produced by a manufacturing machine or process, in combination with throughput control of the product.

Another object of the invention is to provide a new and improved system for and method of controlling, in a noninteracting manner, throughput and a property of a product produced by a machine or process.

A further object of the invention is to provide a new and improved system for and method of controlling thickness and throughput of a product produced by an extruder.

A further object of the invention is to provide a system for and method of controlling thickness and throughput of a plastic sheet produced by an extruder in such a manner that the thickness variations are not reflected in controls made on throughput.

An additional object of the invention is to provide a new and improved system for and method of controlling the feed rate and line speed of an extruder in a noninteracting manner in response to throughput and thickness error signals, wherein the noninteracting control is provided even while safetys for various operating parameters of the extruder are met or exceeded.

The above and still further objects, features and advantages of the present invention will become apparent upon consideration of the following detailed description of several specific embodiments thereof, especially when taken in conjunction with the accompanying drawings.

DETAILED DESCRIPTION OF THE DRAWING

The drawing illustrates the various control blocks as if they were analog computer type blocks. In actuality, however, the various control blocks are preferably segments of a properly programmed, general purpose digital computer. The blocks are shown in analog form to facilitate the presentation. The various operations performed in the blocks are, in actuality, formed by the computer in its arithmetic unit in response to signals stored in the computer memory. Any skilled programmer could program the digital computer in a manner to effect the results of the various control blocks.

Operations are performed in the computer on three different time bases. The longest time base is commensurate with the time required for a gauge to scan between edges of a moving sheet, a time interval generally on the order of 30 seconds to 1 minute. A second, intermediate time base is a basic computation cycle, typically having a duration of 5 seconds. Each of the 5 second intervals is divided into 50 equal intervals, each having a duration of 0.1 second, to provide the shortest time base. Output signals are derived from the computer and supplied to actuators to control the on-time of the actuators as a percentage of the five second interval. Hence, for example, if a signal derived during a 5 second period indicates that an actuator should be driven to one-half of the maximum allowable change during a 5 second interval, 25 pulses are supplied by the computer to the actuator during the 5 second interval.

Figure 1:
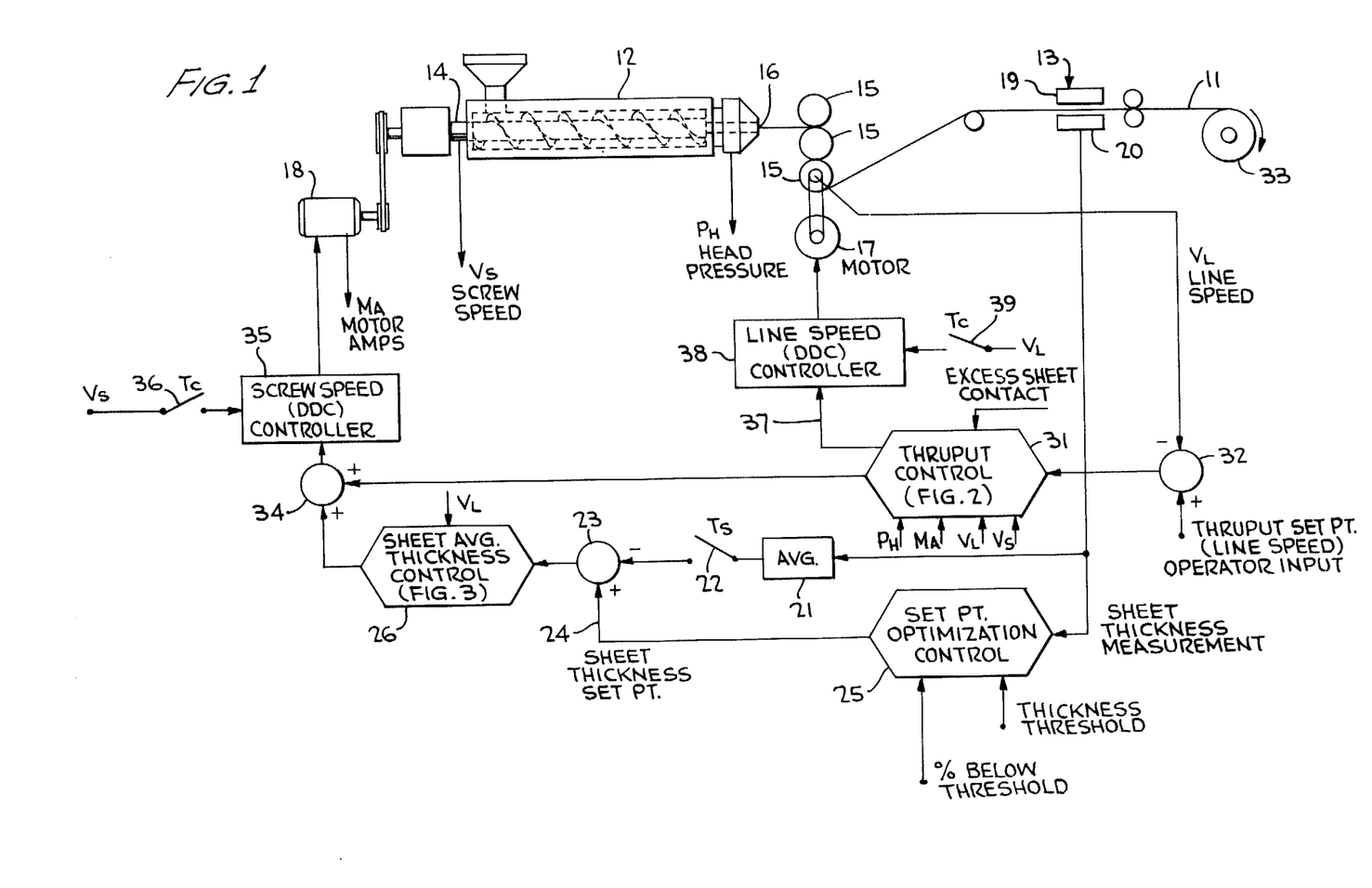
FIG. 1 is a block diagram of one embodiment of the present invention wherein sheet thickness changes only affect screw speed of an extruder.

Reference is now made specifically to FIG. 1 of the drawing wherein there is illustrated a block diagram of a system for controlling the thickness and throughput of a plastic sheet 11 formed by plastic sheet extruding machine 12, of the type disclosed in U.S. Pat. No. 3,015,129 to Hays et al. Extruder 12 and the material therein are such that plastic sheet 11 is deformable as it is fed to chrome rolls 15 from die head 16. Throughput of the extruder machine is thereby dependent upon the take-away speed of sheet 11, $V_L$, from extruder 12, which in turn is responsive to the rotational velocity of rolls 15. Throughput is also dependent on the weight per unit area of sheet 11, which is equivalent to sheet thickness, $T$, since sheet density is constant. One other factor affecting throughput is sheet width, which can be considered constant since knives (not shown) are provided to trim the sheet edges. Throughput of the extruder machine of FIG. 1 can therefore be determined from $V_L T$. Sheet thickness, however is directly proportional to the velocity, $V_S$, of screw 14 and inversely related to take-away speed. Hence, with conventional control techniques, variations in thickness are reflected in throughput and vice versa and control of thickness is normally reflected in throughput. In accordance with the present invention this interaction between thickness control and throughput is prevented.

The thickness of sheet 11 is controlled in response to measurements derived from a non-contacting thickness gauge 13 that is scanned between the edges of sheet 11, at right angles to the sheet edges in a manner well known to those skilled in the art. In FIG. 1, from the output signal of thickness gauge 13, as averaged over one scan of the gauge, and a function of throughput error, control signals are derived for adjusting the feed rate of plastic material into extruder 12. The feed rate of plastic material into extruder 12 is controlled by varying the speed of extruder screw 14. The system of FIG. 1 controls throughput by varying the speed which the plastic sheet 11 formed by extruder 12 is taken away from the extruder, i.e., the take-away or line speed of the machine. In accordance with the present invention, throughput is controlled in a noninteracting manner with variations in the thickness of sheet 11 and solely in response to deviations in throughput relative to a set point value therefor.

Throughput in FIG. 1 is controlled by varying the speed of chrome or chill rollers 15 through which the formed plastic sheet 11 traverses after the sheet has left extruder 12 at die head 16. The speed of chill rollers 15 is controlled by drive motor 17 therefor, which in turn controls the throughput rate of sheet 11. The rotational rate of screw 14, which determines the feed rate of plastic material to extruder 12, is controlled in response to the speed of motor 18.

To enable various operations associated with the apparatus of FIG. 1 to be performed, it is necessary to monitor with, conventional transducers: the speed, $V_S$, of screw 14, the pressure, $P_H$, of die head 16, the throughput rate, as determined by the rotational velocity, $V_L$, of rollers 15 (frequently referred to herein as line speed or take-away speed), and the load on screw 14, as reflected in the current $M_A$, supplied to motor 18. Thickness gauge 13, in one embodiment, responds to the density of sheet 11 passing between a penetrating radiation source 19 and a radiation detector 20. Since the plastic sheet has a constant density, the output signal of gauge 13 is a signal commensurate with the thickness of the area of sheet 11 over which gauge 13 traverses. Gauge 13 supplies an output signal to averaging network 21 which, upon the completion of a scan of gauge 13 across sheet 11, derives a scan average sheet thickness signal that is read out by momentary closure of sampling contact 22. The various signals are fed into the computer memory, where they are stored so that operations can be performed in response thereto prior to initiation of the next scan of gauge 13.

The scan average thickness signal is fed to node 23 where it is compared with a sheet thickness set point signal on lead 24, whereby node 23 derives an output signal indicative of the difference between the sheet thickness set point and the sheet thickness scan average. The sheet thickness set point can be determined on a predetermined basis or by utilizing set point optimization control techniques, such as the type specified in Adams et al. U.S. Pat. No. 3,622,448. If set point optimization control technique is employed, the signal derived from gauge 13 is fed to optimization control element control which derives a target set point signal when appropriate number of scans of gauge 13 have occurred. Set point optimization controller 25 also responds to predetermined signals indicative of a threshold or limit value for the thickness of sheet 11, below which the sheet manufacturer considers the sheet to be defective, as well as to a signal indicative of the percentage of defective sheet the sheet manufacturer is willing to make. The thickness set point signal derived by controller 25 is dependent upon the variance or spread of thickness values as monitored by gauge 13 over a number of scans of the gauge. After the appropriate number of scans has been completed, the sheet thickness set point signal is read from controller 25 to update the signal on lead 24.

The error signal derived from node 23, indicative of the difference between the sheet thickness set point and the scan average thickness, is fed to sheet average thickness controller 26. Sheet average thickness controller 26 also responds to a signal indicative of the machine throughput, as indicated by line speed, $V_L$. The line speed indicating signal is employed to determine the rate of change of sheet thickness with respect to screw speed, as determined by an equation modelling the thickness characteristics of sheet 11 as functions of line speed and screw speed, which equation is written as:

$$T = K_0 + K_1 \frac{V_S}{V_L} + K_2 \frac{V_S}{V_L^2} \qquad (1)$$

where:
$T$ = sheet thickness,
$V_S$ and $V_L$ are defined supra, and
$K_0$, $K_1$ and $K_2$ are constants determined for each extruder machine and associated apparatus, as ascertained by a regression analysis from measurements made on the machine.

The rate of change of thickness with respect to screw speed is determined from Equation (1) as:

$$\frac{\delta T}{\delta V_S} = \frac{K_1}{V_L} + \frac{K_2}{V_L^2} \qquad (2)$$

The rate of change of screw speed with respect to thickness, as determined by the reciprocal of Equation (2), is multiplied by the thickness error signal derived from node 23 to provide an indication of the amount by which the screw speed should be changed in accordance with:

$$\Delta V_S = (T_{SETPT} - \bar{T}) \left( \frac{K_1}{V_L} + \frac{K_2}{V_L^2} \right)^{-1} \qquad (3)$$

where:
$\Delta V_S$ = the total change in screw speed over a scan,
$T_{SETPT}$ = the sheet thickness set point, and
$\bar{T}$ = sheet thickness as averaged over one scan of gauge 13.

The value of $\Delta V_S$ computed in accordance with Equation (3) indicates the total change in the speed of screw 14 over a complete scan of gauge 13. It is desirable to affect the change of $\Delta V_S$ as soon as possible after a scan has been completed.

To enable changes to be made within a scan time, even though the transport lag of material from screw 14 to gauge 13 has not been completed, a technique as disclosed in the copending application of James S. Rice, Ser. No. 8,377, filed Feb. 3, 1970 now U.S. Pat. No. 3,852,578, and commonly assigned with the present application, can be employed. If such control is employed, Equation (1) is utilized as a static mathematical model of the extruder and the extruder time constant is found empirically to establish a dynamic model.

The output signal of sheet average thickness controller 26, which provides one indication of the amount by which the speed of screw 14 should be changed to provide the desired thickness of sheet 11, is combined with a second signal indicative of the amount by which the screw speed should be changed to enable noninteracting control between throughput and thickness. The second signal indicative of the amount by which screw speed should be changed is derived by throughput controller 31. Throughput controller 31 is driven by an error signal responsive to a comparison between actual throughput and desired or set point throughput. To this end, the throughput indicating signal, equal to the line speed signal $V_L$, is differentially combined in subtraction node 32 with a throughput set point signal which an operator feeds into the system. The throughput set point is determined on a predetermined basis, depending upon specifications of sheet 11. Node 32 derives an error signal indicative of the difference between the monitored and set point values of line speed; this error signal is fed as an input to controller 31. To establish safetys and for other purposes, throughput maximization controller 31 also responds to signals indicative of the pressure in die head 16, $P_H$, the load exerted by screw 14 on motor 18, as indicated by the current drawn by the motor, $M_A$, line speed, $V_L$, and screw speed, $V_S$, as well as an automatically or manually controlled contact closure, indicative of excess sheet being formed by extruder 12. The contact closure is a safety to indicate that the amount of sheet 11 produced by the extruder is greater than the amount of material which can be handled by an output processing device (not shown), positioned between gauge 13 and takeup roll 33.

Controller 31 responds to its several input signals to derive signals that indicate desired total change, over a scan of gauge 13, in the speed of screw 14, $\Delta V_S$, and desired total change in the speed of sheet 11, $\Delta V_L$, as the sheet is taken from extruder 12. The values of $\Delta V_L$ and $\Delta V_S$ are respectively made to equal the error signal derived from node 32 and the product of the error signal derived from node 32 and the rate of change of screw speed with respect to line speed, provided no safetys concerning screw and line speed are exceeded. The rate of change of screw speed with respect to line speed is computed by taking the model equation partial derivatives of rate of change of thickness with respect to line speed ($\delta T/\delta V_L$) and rate of change of thickness with respect to screw speed ($\delta T/\delta V_S$) and dividing the two partial derivatives to yield:

$$\frac{\delta V_S}{\delta V_L} = -\frac{V_S(K_1V_L + 2K_2)}{V_L(K_1V_L + K_2)} \quad (4)$$

The total screw speed and line speed changes over a scan of gauge 13 are segmented into appropriate signal levels over the several five second durations of a scan to ramp the changes gradually through a scan of gauge 13.

The screw speed change indication is fed by controller 31 to node 34, where it is linearly combined in an additive manner with the screw speed change output signal of controller 26. The resulting summation, indicative of the total screw speed change is fed to a conventional direct digital controller 35, which is also responsive to a signal indicative of the actual screw speed, $V_S$, derived by the transducer responsive to the rotational velocity of screw 14. The screw speed signal, $V_S$, is fed to controller 35 once every 5 seconds through contact 36. The controller responds to the difference between the accumulated screw speed derived from node 34, which indicates a screw speed set point, and the measured screw speed to derive an error signal that drives motor 18.

Throughput changes, as reflected in changes in the set point of motor 17, are derived by controller 31 on line 37. The signal on line 37 is completely independent of thickness variations as monitored by gauge 13. Thereby, there is no interaction between throughput and thickness variations, whereby the necessity to make a change to the speed of motor 18, wait for that change to be reflected in throughput, then make a correction to throughput, and thereafter make a further possible correction to motor speed in an iterative manner is obviated. The noninteraction between throughput and thickness variations occurs because controllers 26 and 31 respond to the errors in sheet thickness and throughput, as well as the partial derivatives $\delta T/\delta V_S$ and $\delta V_S/\delta V_L$, as determined from Equations (2) and (4).

The signal on line 37 is fed to line speed controller 38, which is also responsive to the $V_L$ signal, as sampled once every 5 seconds by being fed through contact 39 to direct digital controller 38. Controller 38 accumulates the line speed change signals on line 37 to derive a line speed set point that is compared with the measured line speed, $V_L$, to produce an error signal which controls motor 17 concomitantly with motor 18.

Figure 2:
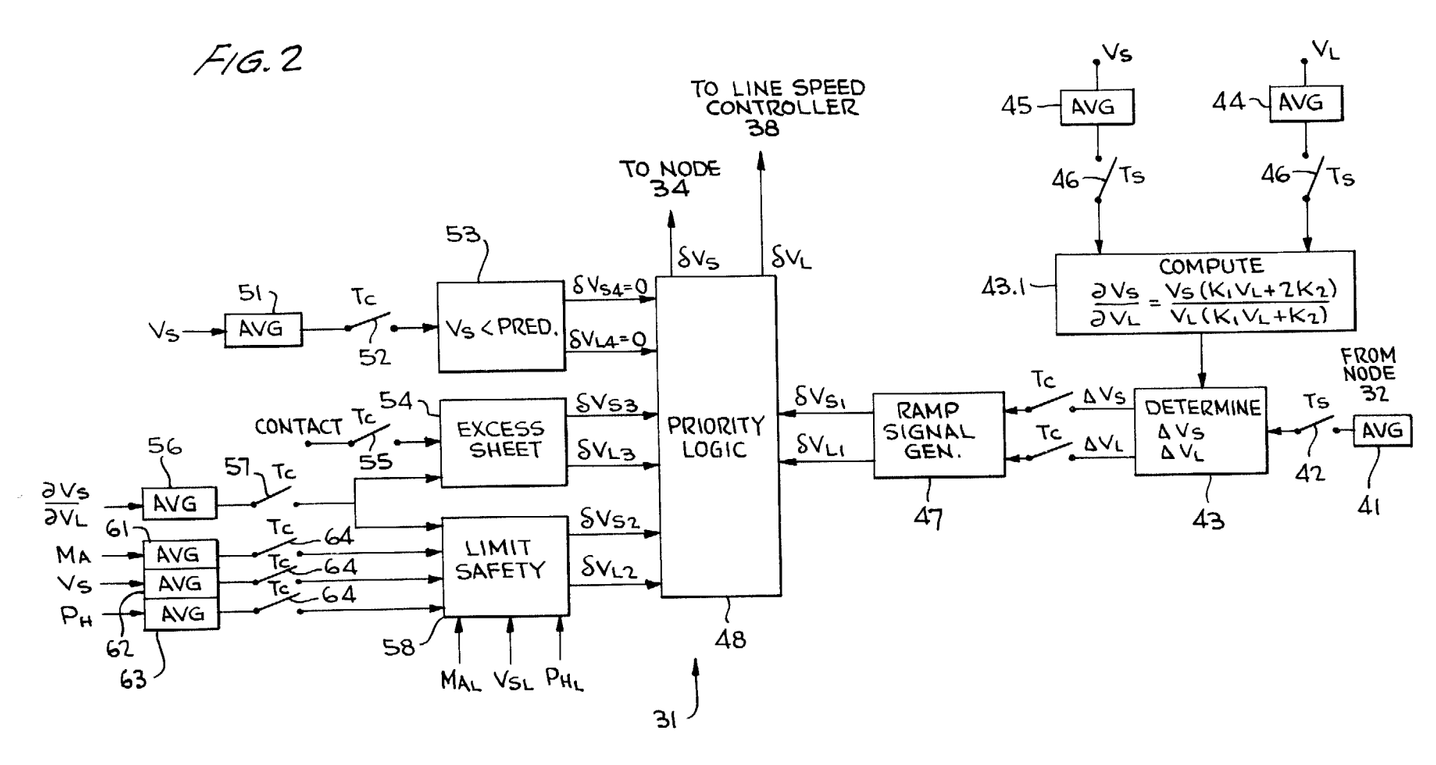
FIG. 2 is a block diagram of the throughput control block of FIG. 1.

Reference is now made to FIG. 2 of the drawing wherein there is illustrated a block diagram of throughput controller 31, FIG. 1. Throughput controller 31 responds to the throughput error signal derived from node 32, FIG. 1, to average the error signal over a small portion of a scan of gauge 13 in short term averaging element 41. Upon the completion of a scan of gauge 13, the average throughput error is read from element 41 and fed through contact 42 to computer element 43. Once every scan of gauge 13, computer element 43 also responds to the short term average value of $\delta V_S/\delta V_L$. To this end, the line and screw speed signals are respectively supplied to short term averaging elements 44 and 45. When a scan of gauge 13 has been completed, the average values in elements 44 and 45 are sampled by closure of contacts 46 to enable $\delta V_S/\delta V_L$ to be computed in accordance with Equation (4), supra.

Element 43 responds to the throughput error signal and $\delta V_S/\delta V_L$ to determine the value of $\Delta V_L$, the total change in line speed during a gauge scan, from the minimum of the absolute values of the:

1. throughput error as determined by the difference between line speed measured and set point values,
2. maximum change in the line speed allowed during a scan of gauge 13, a predetermined constant determined by the extruder properties, and
3. product of $\delta V_L/\delta V_S$ and the maximum allowable change in screw speed for a scan of gauge 13, a predetermined factor determined by the extruder properties. The value of $\delta V_L/\delta V_S$ is determined by taking the reciprocal of $\delta V_S/\delta V_L$. If the minimum is in accordance with number one, supra, normal operation occurs, but if number two or three, supra, is the minimum, a safety has been reached and normal system operation does not occur. Operations 1–3 indicate the absolute value of the change in line speed during a scan. To determine the direction in which the line speed should be made, the polarity of the error signal derived from node 32 is inspected and affixed to the minimum value determined during operations (1), (2) or (3). After the value of $\Delta V_L$ has been determined, $\Delta V_S$ is determined in a coordinated manner from the values of $\Delta V_L$ and $\delta V_S/\delta V_L$ as $\Delta V_L \times \delta V_S/\delta V_L$.

Hence, in normal operation, $$\Delta V_L = V_{L\;SETPT} - V_L \quad (5), \text{ and}$$
$$\Delta V_S = -(V_L - V_{L\;SETPT})\;\frac{V_S(K_1V_L + 2K_2)}{V_L(K_1V_L + K_2)} \quad (6).$$

The values of $\Delta V_L$ and $\Delta V_S$ computed in accordance with Equations (5) and (6) enable noninteraction of throughput control as a function of take-away speed to be performed even if the safetys of items (2) or (3) are met.

The $\Delta V_S$ and the $\Delta V_L$ signals are derived by element 43 over a scan of gauge 13. The $\Delta V_S$ and $\Delta V_L$ values are inspected during each five second computation cycle and fed to ramp generator 47 which derives signals $\delta V_{S1}$ and $\delta V_{L1}$, indicative of the size of step changes to be made within each five second computation interval. The output signals of ramp signal generator 47 are fed to priority logic element 48.

Priority logic element 48 is a safety check element which feeds the $\delta V_{S1}$, $\delta V_{L1}$ signals of generator 47 to node 34 and line speed controller 38, respectively, provided none of the safetys fed to the priority logic element is activated. If one of the safetys is activated a predetermined, maximum safety value for line speed is fed to controller 38 to the exclusion of the $\delta V_{L1}$ output signal of generator 47. Concomitantly with deriving the predetermined, safety value for the line speed change signal, a coordinated screw speed signal is calculated and fed to screw speed controller 35. To this end, the predetermined, safety value is multiplied by $\delta V_S/\delta V_L$, as determined by computer element 43.1. If more than one safety value for a change in the line speed is derived during the same 5 second computation interval, priority logic element 48 gates the safety value having the highest priority to speed controller 38 and the corresponding, coordinated screw speed change to controller 35.

The safetys monitored by priority logic 48 are: excessively low speed for screw 14, as derived by monitoring the value of $V_S$; excess sheet between rollers 15 and 33, as indicated by a contact being closed for a predetermined time interval; the load on screw 14 being excessive, as indicated by the current, $M_A$, supplied to motor 18; the speed of screw 14 being excessive, as indicated by the value of $V_S$; or the pressure in die head 16 being excessive, as indicated by the value of $P_H$.

The highest priority safety concerns excessively slow speed of screw 14 because if the screw is turning too slowly, insufficient material is supplied to extruder 12 and formation of sheet 11 becomes uncertain. Thereby, in response to $V_S$ being less than a predetermined minimum limit, an alarm is activated and changes in the values of $V_L$ and $V_S$ are prevented. To these ends, the $V_S$ signal is supplied to averaging element 51, the output of which is sampled once every 5 seconds in response to closure of contact 52. In response to the average value of $V_S$ being less than the predetermined minimum limit therefor, as determined by decision element 53 which is responsive to the signal fed through contact 52, element 53 derives output signals having values of $\delta V_{L4} = \delta V_{S4} = 0$. In addition, element 53 supplies a flag to priority logic network 48, whereby the priority logic network feeds the $\delta V_{S4}$ and $\delta V_{L4}$ output signals of element 53 to node 34 and controller 38. Thereby, further changes in the speed of screw 14 and the speed of sheet 11 cannot be made.

If element 53 does not set a flag, the priority logic element 48 inspects excess sheet decision element 54 to determine if an excess amount of sheet 11 exists between rollers 15 and 33. Excess sheet element 54 responds to closure of a contact (not shown) which can be automatically or manually closed to feed a binary one signal to excess sheet element 54 each time a basic computation 5 second interval has been completed, as determined by closure of switch contact 55. In response to excess sheet element 54 indicating that an excess sheet condition exists which must be corrected, the excess sheet element derives a predetermined value, $\delta V_{L3}$, output signal that is fed by priority logic network 48 to line speed controller 38. To provide co-ordination for the line speed change supplied by priority logic network 48 to controller 38, excess sheet element 54 includes means for determining the screw speed change, $\delta V_{S3}$, in accordance with $\delta V_{L3} \times (\delta V_S/\delta V_L)$.

To derive the quantity $\delta V_S/\delta V_L$, the output signal of computation element 43.1 is fed to averaging element 56. The output signal of averaging the element 56 is sampled once each basic five second computation cycle by closure of contact 57, which feeds excess sheet element 54. To enable the $\delta V_{L3}$ and $\delta V_{S3}$ output signals of excess sheet element 54 to be fed to node 34 and controller 38, excess sheet element 54 sets a flag as coupled to priority logic element 48. The flag enables the change indicating output signals of excess sheet element 54 to be coupled to the priority logic element output terminals if no flag is set by decision element 53.

In response to any of $M_A$, $V_S$ or $P_H$ exceeding a predetermined limit, $M_{AL}$, $V_{SL}$ or $P_{HL}$ limits, safety element 58 is provided. If any of $M_A$, $V_S$ or $P_H$ exceeds the limit values thereof, limit safety element 58 outputs a predetermined signal for the change in line speed over a 5 second computation period, $\delta V_{L2}$. In response to the values of $\delta V_{L2}$ and $\delta V_S/\delta V_L$, as fed through contact 57, the value of $\delta V_{S2}$ is computed in accordance with $\delta V_{L2} \times \delta_{1S}/\delta V_L$.

Limit safety element 58 compares the values of $M_A$, $V_S$ and $P_H$ with the limit values $M_{AL}$, $V_{SL}$ and $P_{HL}$, as averaged over a basic 5 second computation interval. To these ends, the values of $M_A$, $V_S$, and $P_H$ are respectively fed to averaging elements 61–63, the outputs of which are fed through contacts 64, all of which are closed once every 5 seconds, to the input of limit safety element 58. In response to any of $M_A$, $V_S$ or $P_H$, exceeding the safety limit therefor for more than a predetermined time interval, such as 15 seconds, limit safety element 58 sets a flag that is fed to priority logic element 48. The priority logic element 48 responds to the flag derived from limit safety element 58 to feed the values of $\delta V_L$ and $\delta V_S$ to line speed controller 38 and node 34, respectively, provided the flags associated with elements 53 and 54 have not been set. If none of the elements 53, 54 or 58 sets a flag, priority logic element 48 feeds the $\delta V_{L1}$ and $\delta V_{S1}$ output signals of signal generator 47 to line speed controller 38 and node 34.

Figures 3, 4:
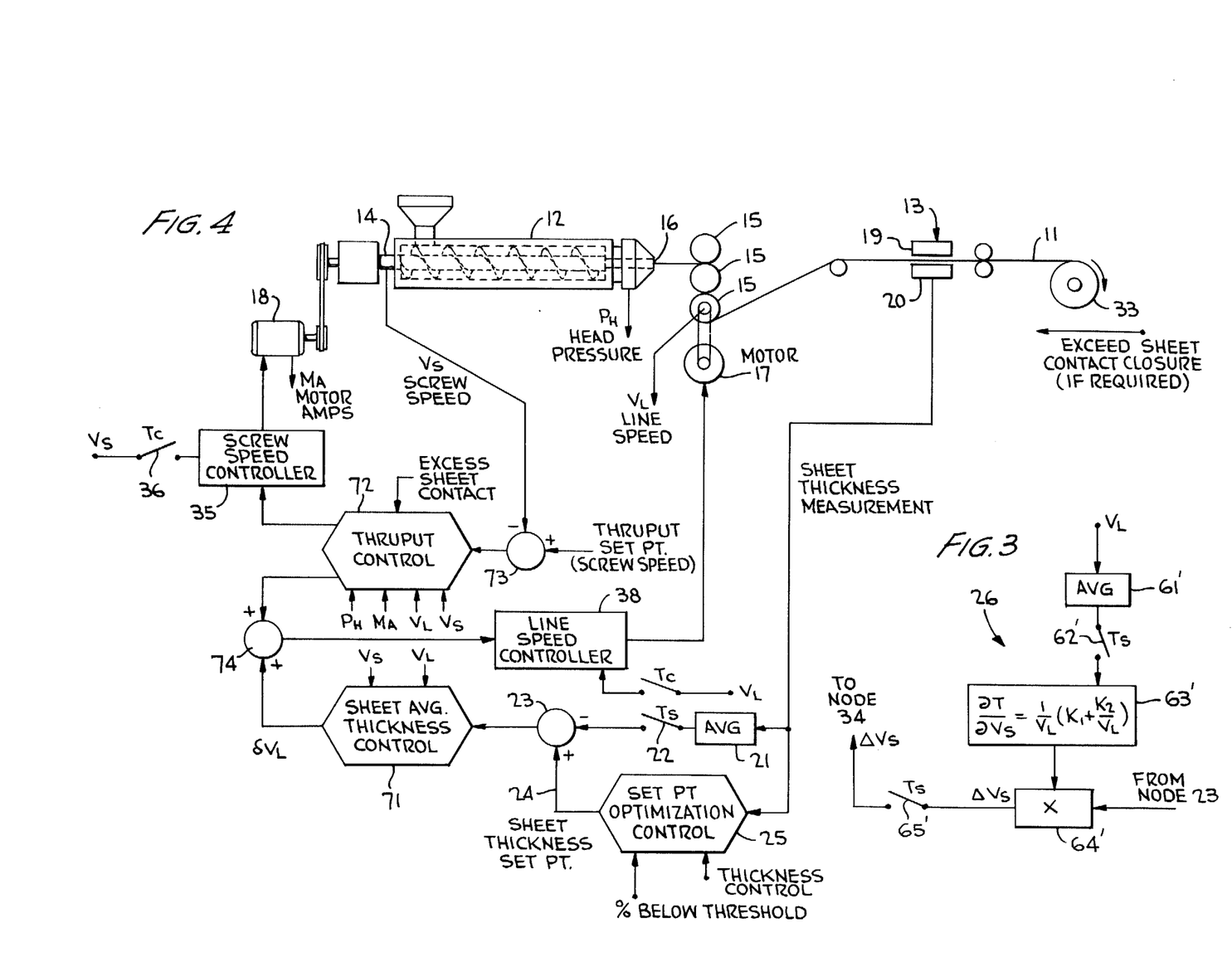
FIG. 3 is a block diagram of the sheet average thickness control block of FIG. 1.
FIG. 4 is a block diagram of a second embodiment of the invention wherein sheet thickness changes only affect take-away speed of an extruder.

One embodiment for sheet average thickness controller 26 is illustrated in FIG. 3. Sheet average thickness controller 26 responds to the thickness error signal derived from node 23 and the line speed signal $V_L$. The line speed signal is averaged over a portion of a scan of gauge 13 in short term averaging element 61', the output of which is sampled once each scan by closure of contact 62'. The signal fed through sampling contact 62' is employed in computation element 63' to compute the rate of change of thickness with respect to screw speed in accordance with Equation (2) supra. The reciprocal of the value of $\delta T/\delta V_S$ is fed by computing element 63' to multiplier element 64' where it is combined with the sheet thickness error signal derived from node 23 in a multiplicative manner to derive the signal $\Delta V_S$ in accordance with Equation (3) supra. The output signal of multiplier 64' is indicative of the total change in the speed of screw 14 over a complete scan of gauge 13. The $\Delta V_S$ output signal of multiplier 64' is sampled once per scan by closure of sampling contact 65'. The signal fed through contact 65' is combined in node 34 with the $\delta V_S$ output signal of priority logic element 48, FIG. 2.

The system of FIGS. 1 – 3 is based upon controlling the speed of screw 14 in response to error signals in the thickness of sheet 11 and throughput, while the take-away speed of sheet 11 is responsive to throughput errors independently of thickness errors and therefore thickness variations. In accordance with the system of FIG. 4, the situation is reversed, whereby throughput is controlled by the speed of screw 14 independently of variations in the thickness of sheet 11 while the line speed of sheet 11 is responsive to throughput and sheet thickness errors.

In the system of FIG. 4, the sheet thickness error signal is determined once each scan of gauge 13 by node 23 in exactly the same manner described supra with regard to FIG. 1. Sheet average thickness controller 71 responds to the error signal derived from node 23 and the screw speed and line speed signals $V_S$ and $V_L$, to derive an output signal $\delta V_L$ that is employed for establishing a set point for line speed controller 38. The value of line speed change over a scan of gauge 13, $\Delta V_L$, is computed in controller 71 by multiplying the sheet thickness error signal by the reciprocal of the rate of change of thickness with respect to line speed, i.e., rate of change of line speed with respect to thickness. The rate of change of line speed with respect to thickness, $\delta V_L/\delta T$, is computed from Equation (1) as:

$$\left[\frac{\delta T}{\delta V_L}\right]^{-1} = \left[-K_1 \frac{V_S}{V_L^2} - 2K_2 \frac{V_S}{V_L^3}\right]^{-1} \quad (7)$$

The values of $V_S$ and $V_L$ are averaged over a small portion of each scan of gauge 13 and supplied to a computation element in controller 71. Except for the equation solved by the computation element and the feeding of a $V_S$ as well as a $V_L$ signal to control element 71, the control element 71 is identical with control element 26, FIG. 1.

Line speed controller 38, in addition to being responsive to the $\delta V_L$ output signal of controller 71, is responsive to a $\delta V_L$ output signal of throughput controller 72. Throughput controller 72 responds to the throughput error, the set point for the speed of screw 14 minus the actual speed of screw 14, as derived by difference node 73. The error signal derived by node 73 determines the amplitude of output signals of throughput controller 72, provided no safetys are set by controller 72. If no safetys are set by controller 72, the throughput error signal from node 73 is fed by controller 72 directly to screw speed controller 35 to establish a change for the set point value for screw speed, $\Delta V_S$, over a scan of gauge 13. Line speed change, $\Delta V_L$, over scan of gauge 13 is computed by throughput controller 72, provided no safetys are set thereby, by multiplying the throughput error signal derived from node 73 by $\delta V_L/\delta V_S$. $\delta V_L/\delta V_S$ is determined from Equation (1) so that it is equal to the reciprocal of the quantity determined by computer element 43.1, FIG. 2. Throughput controller 72 responds to $\Delta V_S$ and $\Delta V_L$ to provide ramp signals, $\delta V_S$ and $\delta V_L$ for indicating changes in the speeds of motors 18 and 17, during each 5 second basic computation interval. The $\delta V_L$ output signal of throughput controller 72 is fed to summing node 74, where it is linearly combined in an additive manner with the $\delta V_L$ output signal of sheet average thickness controller 71. The summation signal derived by node 74 is fed to line speed controller 38 to provide a set point signal for the speed at which sheet 11 is removed from extruder machine 12.

Throughput controller 72 responds to the same parameters as throughput controller 31, FIG. 1. In controller 72, $\Delta V_S$ and $\Delta V_L$ are determined in an element corresponding with element 43 by taking the minimum of the absolute value of the:

1. throughput error as determined by the difference between measured and set point screw speeds;
2. maximum allowed change in screw speed per scan; and
3. maximum allowed line speed change per scan multiplied by $\delta V_S/\delta V_L$.

After the maximum value of $\Delta V_S$ is determined, the value of $\Delta V_L$ is determined as $\Delta V_S \times \delta V_L/\delta V_S$.

Throughput control 72 also includes an element similar to priority logic element 48 of FIG. 2. In the priority logic element of controller 72, however, the screw speeds $\delta V_{S3}$ and $\delta V_{S2}$ are set at predetermined values, and the line speed changes are coordinated from the model equation in response to $\delta V_L/\delta V_S$; as in element 48 of FIG. 2, $\delta V_{L4} = \delta V_{S4} = 0$.

While there have been described and illustrated several specific embodiments of the invention, it will be clear that variations in the details of the embodiments specifically illustrated and described may be made without departing from the true spirit and scope of the invention as defined in the appended claims. If a relatively slow response type of operation can be tolerated, thickness and other measurements can be derived in response to several scans of gauge 13, e.g., time exponential weighting of the several signals can be performed over more than one scan of the gauge. It is to be understood that the principles of the invention are applicable to other types of machines and processes, provided there is an affect on throughput by a property or vice versa.

I claim:

1. In combination with apparatus for controlling an industrial product forming machine responsive to a supply of input material, first means for feeding the material to the machine, second means for taking the product formed by the machine away from the machine, both said first and second means being capable of affecting a thickness or weight property and throughput of the product formed by the machine, means for measuring the property of the formed product, means responsive to the property measuring means for comparing the measured property value with a set point for the property value to derive a first error signal, means for measuring the throughput of the machine, means for comparing the measured throughput with a set point value for throughput to derive a second error signal, means responsive to the first error signal for deriving another signal indicative of the amount by which the rate of one of the first or second means should be changed due to the property comparison, means responsive to the second error signal for deriving a further signal indicative of the amount by which the rate of said one means should be changed due to the throughput comparison, means combining said another and further signals for controlling the rate of said one means, and means responsive to said second error signal for controlling the rate of the other of the first or second means so that interaction between control of the property and throughput in the formed sheet is substantially prevented.

2. The apparatus of claim 1 wherein both of the control means concomitantly control the rates of the one and other means.

3. The apparatus of claim 1 wherein the means for deriving an indication of the total amount by which the rate of said one means should be changed includes means for computing a first response indicative of the rate of change of the rate of said one means with respect to the property, means for multiplying the first response and the property error, means for computing a second response indicative of the rate of change and said one means with respect to said other means, means for multiplying the second response and the throughput error to derive the indication of the amount by which the rate of the other means should be changed, means for multiplying the reciprocal of the second response and the indication of the amount by which the other means should be changed, and means for adding together the multiplied first response and the multiplied reciprocal of the second response.

4. The apparatus of claim 3 wherein said one means is the take-away means and the other means is the screw, said means for computing the first response includes means responsive to indications of the take-away and screw speeds for computing $$\left[\frac{\delta T}{\delta V_L}\right]^{-1} = -\left[\left(\frac{V_S}{V_L^2}\right)\left(K_1 + \frac{2K_2}{V_L}\right)\right]^{-1}$$

where:
$T$ = thickness
$V_S$ = screw speed
$V_L$ = take-away speed
$K_1$ and $K_2$ = predetermined constants and said means for computing the second response includes means responsive to indications of the screw and take-away speeds for computing $$\left[\frac{\delta V_S}{\delta V_L}\right]^{-1} = \left[\frac{V_S(K_1V_L + 2K_2)}{V_L(K_1V_L + K_2)}\right]^{-1}$$

5. The apparatus of claim 3 wherein said one means is the input screw and the other means is the take-away means, said means for computing the first response includes means responsive to an indication of the take-away speed for computing $$\left[\frac{\delta T}{\delta V_S}\right]^{-1} = \left[\frac{K_1}{V_L} + \frac{K_2}{V_L^2}\right]^{-1}$$

where:
$T$ = thickness
$V_S$ = screw speed
$V_L$ = take-away speed
$K_1$ and $K_2$ = predetermined constants, and said means for computing the second response includes means responsive to indications of the screw and take-away speeds for computing $$\frac{\delta V_S}{\delta V_L} = -\frac{V_S(K_1V_L + 2K_2)}{V_L(K_1V_L + K_2)}$$

6. The apparatus of claim 3 wherein the means for deriving an indication of the amount by which the rate of said one means should be changed includes means for comparing the multiplied first and second responses with predetermined limits therefor, means responsive to either multiplied response exceeding its limit for setting to a predetermined level the amount by which the exceeded rate should be changed.

7. The apparatus of claim 1 further including means for measuring line speed of the formed sheet product to derive the throughput measurement, the second error signal deriving means including means for comparing the measured line speed with a set point value for line speed, said means responsive to functions of the first and second error signals controlling the screw.

8. The apparatus of claim 1 further including means for measuring screw speed of the formed sheet product to derive the throughput measurement, the second error signal deriving means including means for comparing the measured screw speed with a set point value for screw speed, said means responsive to functions of the first and second error signals controlling the taking means.

9. Apparatus for controlling an industrial product forming machine or process responsive to a supply of input material, said machine or process including first means for feeding the material to the machine or process and second means for taking a product formed by the machine or process away from it, both said first and second means being capable of affecting a thickness or weight property and throughput of the product formed by the machine or process, comprising means for deriving a first signal indicative of an error between a value of the property of the formed product and a set point value for the product, means for deriving a second signal indicative of an error between throughput of the machine and a set point value for the throughput, means responsive to the first signal for deriving a third signal indicative of the amount by which the rate of one of the first or second means should be changed due to the property error, means responsive to the second signal for deriving a fourth signal indicative of the amount by which the rate of said one means should be changed due to the throughput error, means combining said third and fourth signals for deriving a first indication of the total amount by which the rate of said one means should be changed, means for controlling the rate of said one means in response to the first indication, means responsive to the second signal for deriving a second indication of the amount by which the rate of the other of the first or second means should be changed, and means for controlling said other means in response to the second indication so that interaction between control of the property and throughput in the formed sheet is substantially prevented.

10. The apparatus of claim 9 further including means for setting the change in the rate of said other means to a predetermined value in response to an indication of excessive quantities of the sheet being produced, and means for controlling the speed of said one means in response to the predetermined value and the rate of change of said one means with respect to said other means.

11. The apparatus of claim 9 further including means for setting the change in the rate of said other means to a predetermined value in response to an indication of excess load on the screw, and means for controlling the speed of said one means in response to the predetermined value and the rate of change of said one means with respect to said other means.

12. The apparatus of claim 9 further including means for setting the change in the rate of said other means to a predetermined value in response to an indication of excess screw speed, and means for controlling the speed of said one means in response to the predetermined value and the rate of change of said one means with respect to said other means.

13. The apparatus of claim 9 further including means for setting the change in the rate of said other means to a predetermined value in response to an indication of excess pressure in a die head of the extruder, and means for controlling the speed of said one means in response to the predetermined value and the rate of change of said one means with respect to said other means.

14. The apparatus of claim 9 wherein the means for deriving an indication of the total amount by which the rate of said one means should be changed includes means for computing a first response indicative of the rate of change of the rate of said one means with respect to the property, means for multiplying the first response and the property error, means for computing a second response indicative of the rate of change of said one means with respect to said other means, for multiplying the second response and the throughput error to derive the indication of the amount by which the rate of the other means should be changed, means for multiplying the reciprocal of the second response and the indication of the amount by which the other means should be changed, and means for adding together the multiplied first response and the multiplied reciprocal of the second response.

15. The apparatus of claim 9 wherein both of the control means concomitantly control the rates of the one and other means.

16. The apparatus of claim 9 wherein the means for deriving an indication of the total amount by which the rate of said one means should be changed includes means for computing a first response indicative of the rate of change of the rate of said one means with respect to the property, means for multiplying the first response and the property error, means for computing a second response indicative of the rate of change of said one means with respect to said other means, means for multiplying the second response and the throughput error to derive the indication of the amount by which the rate of the other means should be changed, means for multiplying the reciprocal of the second response and the indication of the amount by which the other means should be changed, and means for adding together the multiplied first response and the multiplied reciprocal of the second response.

17. Apparatus for controlling an extruder system responsive to a supply of input material, said extruder system including an input screw for feeding the material to the extruder and means for taking a sheet product formed by the extruder away from the extruder, said screw and means for taking the product away from the extruder being capable of affecting thickness of the sheet and throughput of the sheet, comprising means for measuring the thickness of the formed sheet, means for measuring throughput of the sheet formed by the extruder, means responsive to both said measuring means for deriving first and second error signals respectively indicative of the deviation of the measured thickness and throughput relative to thickness and throughput set point values, means responsive to functions of the first and second error signals for controlling the rate of one of said screw or taking means, and means responsive to a function of the second error signal for controlling the rate of the other of the screw or taking means so that interaction between control of the thickness and throughput in the formed sheet is substantially prevented.

18. The apparatus of claim 17 further including means for preventing further changes in screw and take-away speeds in response to the screw being less than a predetermined value.

19. The apparatus of claim 17, further including means for setting the change in the rate of said other means to a predetermined value in response to an indication of excessive quantities of the sheet being produced in a predetermined time interval, and means for controlling the speed of said one means in response to the predetermined value and the rate of change of said one means with respect to said other means.

20. The apparatus of claim 17 further including means for setting the change in the rate of said other means to a predetermined value in response to an indication of excess load on the screw, and means for controlling the speed of said one means in response to the predetermined value and the rate of change of said one means with respect to said other means.

21. The apparatus of claim 17 futher including means for setting the change in the rate of said other means to a predetermined value in response to an indication of excess screw speed, and means for controlling the speed of said one means in response to the predetermined value and the rate of change of said one means with respect to said other means.

22. The apparatus of claim 17 further including means for setting the change in the rate of said other means to a predetermined value in response to an indication of excess pressure in a die head of the extruder, and means for controlling the speed of said one means in response to the predetermined value and the rate of change of said one means with respect to said other means.

23. The apparatus of claim 17 further including means for measuring screw speed of the formed sheet product to derive the throughput measurement, the second error signal deriving means including means for comparing the measured screw speed with a set point value for screw speed, said means responsive to functions of the first and second error signals controlling the taking means.

24. The apparatus of claim 17 wherein both of the control means concomitantly control the rates of the one and other means.

25. The apparatus of claim 17 wherein the means for deriving an indication of the total amount by which the rate of said one means should be changed includes means for computing a first response indicative of the rate of change of the rate of said one means with respect to thickness, means for multiplying the first response and the thickness error, means for computing a second response indicative of the rate of change of said one means with respect to said other means, means for multiplying the second response and the throughput error to derive the indication of the amount by which the rate of the other means should be changed, means for multiplying the reciprocal of the second response and the indication of the amount by which the other means should be changed, and means for adding together the multiplied first response and the multiplied reciprocal of the second response.

26. The apparatus of claim 17 further including means for measuring line speed of the formed sheet product to derive the throughput measurement, the second error signal deriving means including means for comparing the measured line speed with a set point value for line speed, said means responsive to functions of the first and second error signals controlling the screw.

* * * * *